United States Patent [19]

Hyde

[11] Patent Number: 4,895,268

[45] Date of Patent: Jan. 23, 1990

[54] METHOD OF MAKING A HOLLOW PLASTIC ARTICLE

[75] Inventor: James P. Hyde, Saline, Mich.

[73] Assignee: Ford Motor Company, Dearborn, Mich.

[21] Appl. No.: 233,103

[22] Filed: Aug. 17, 1988

[51] Int. Cl.$^4$ ............................................. B65D 1/00
[52] U.S. Cl. .............................. 220/85 R; 220/5 A; 280/834
[58] Field of Search ................... 220/5 A, 85 R, 85 S, 220/408; 280/834

[56] References Cited

U.S. PATENT DOCUMENTS

| | | |
|---|---|---|
| 2,760,233 | 8/1956 | Bjorksten . |
| 3,169,086 | 2/1965 | Meissner . |
| 3,225,951 | 12/1965 | Poston et al. ................ 220/85 R |
| 3,286,871 | 11/1966 | Eberline ........................ 220/5 A |
| 3,479,421 | 11/1969 | Armbruster . |
| 3,489,829 | 1/1970 | Lipfert . |
| 3,575,949 | 4/1971 | Humphrey . |
| 3,744,656 | 7/1973 | Schiemann . |
| 4,070,429 | 1/1978 | Uhlig . |
| 4,187,276 | 2/1980 | Amberg . |
| 4,206,171 | 6/1980 | Uhlig . |
| 4,207,284 | 6/1980 | Speas . |
| 4,382,058 | 5/1983 | Watson et al. . |
| 4,659,531 | 4/1987 | Ezaki . |

Primary Examiner—Gerald A. Michalsky
Attorney, Agent, or Firm—Peter D. McDermott; Roger L. May

[57] ABSTRACT

A blow molding process is disclosed for making the products having at least one substantially solid attachment projection unitary with and projecting outwardly from an exterior wall. The process comprises the steps of:

(A) forming a molten plastic parison;
(B) enclosing the parison within a cavity formed by cooperating blow molding die parts, a void in fluid communication with such cavity and having a configuration corresponding to that desired for the attachment projection being provided at a parting line between one and another of the die parts;
(C) introducing fluid pressure into the parison to expand it outwardly within the cavity and to flow molten plastic into the void; and
(D) opening the blow mold and removing the product.

A second aspect of the invention provides a motor vehicle fuel tank comprising a blow molded exterior wall having (a) at least one substantially solid attachment projection unitary with and projecting outwardly from an exterior surface of such wall, and (b) a heat shield mounted on such attachment projection in fixed space relation to the exterior surface of the tank wall.

3 Claims, 5 Drawing Sheets

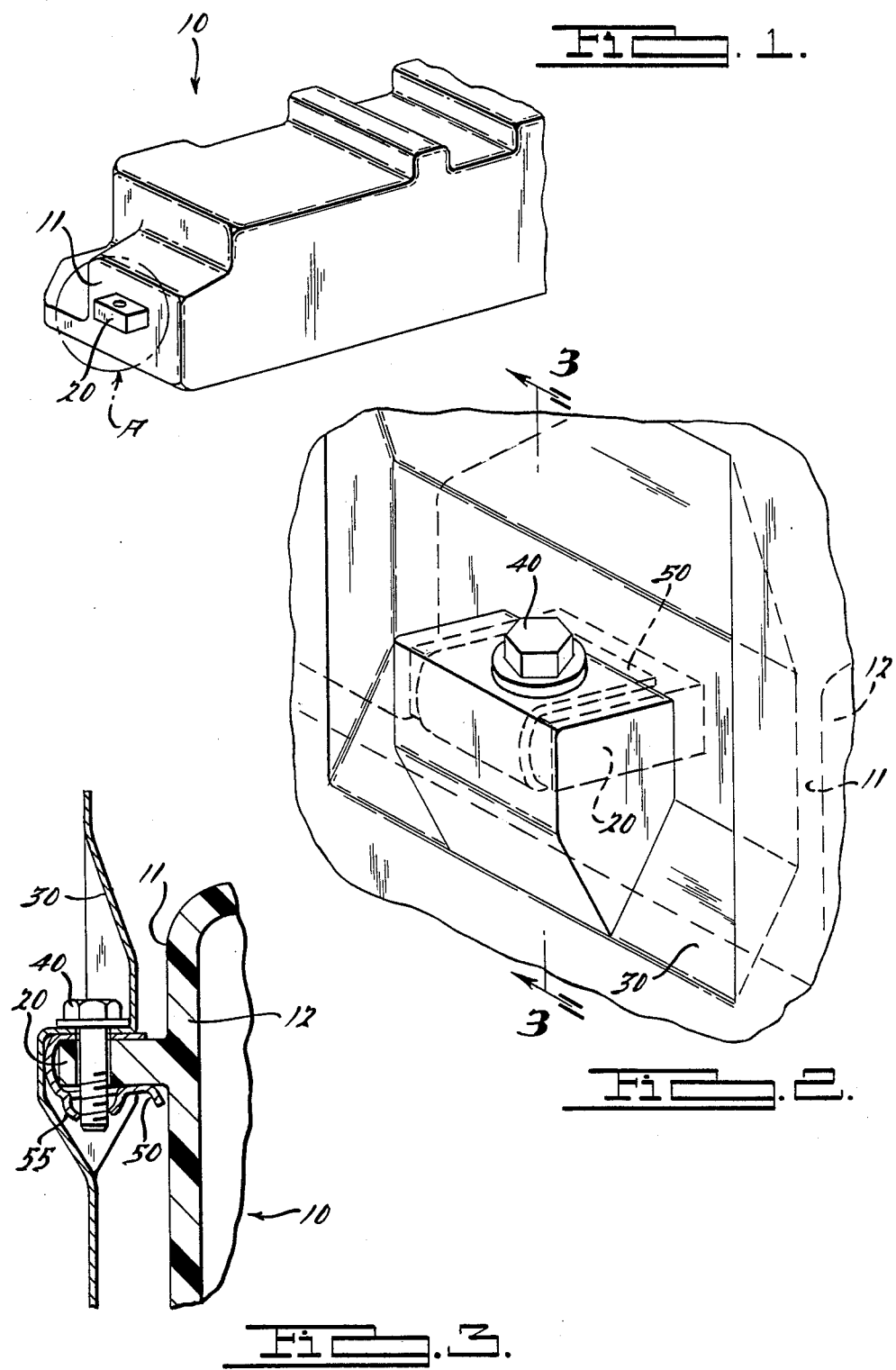

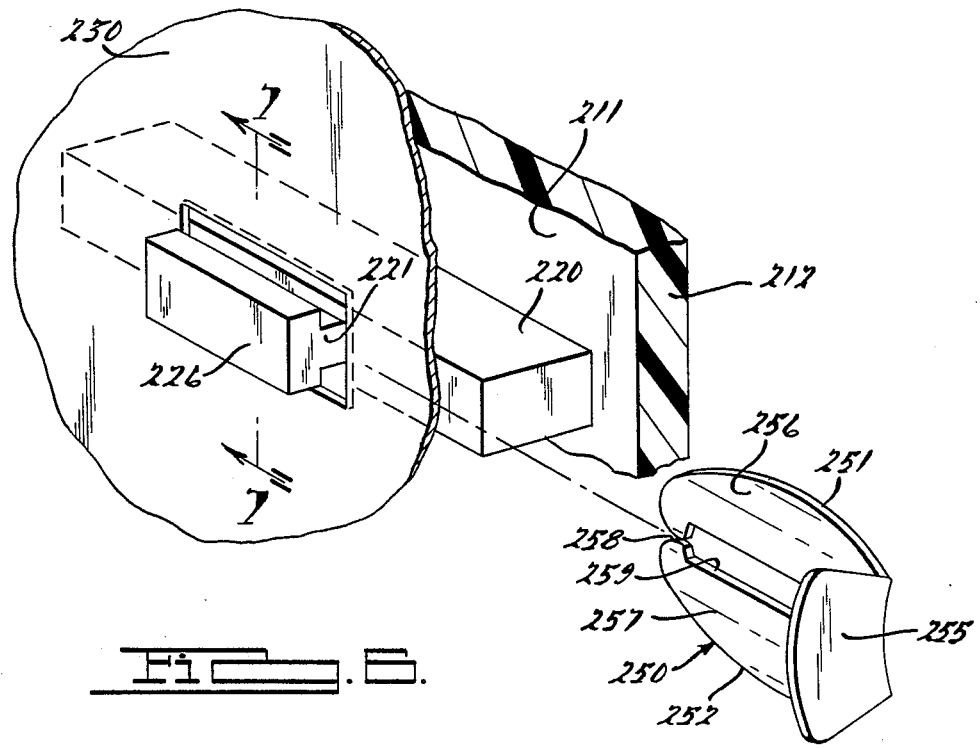
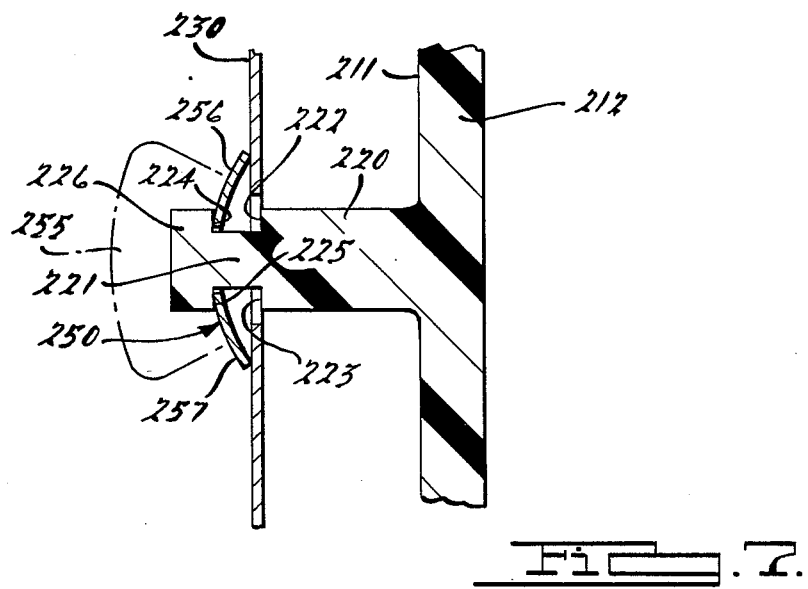

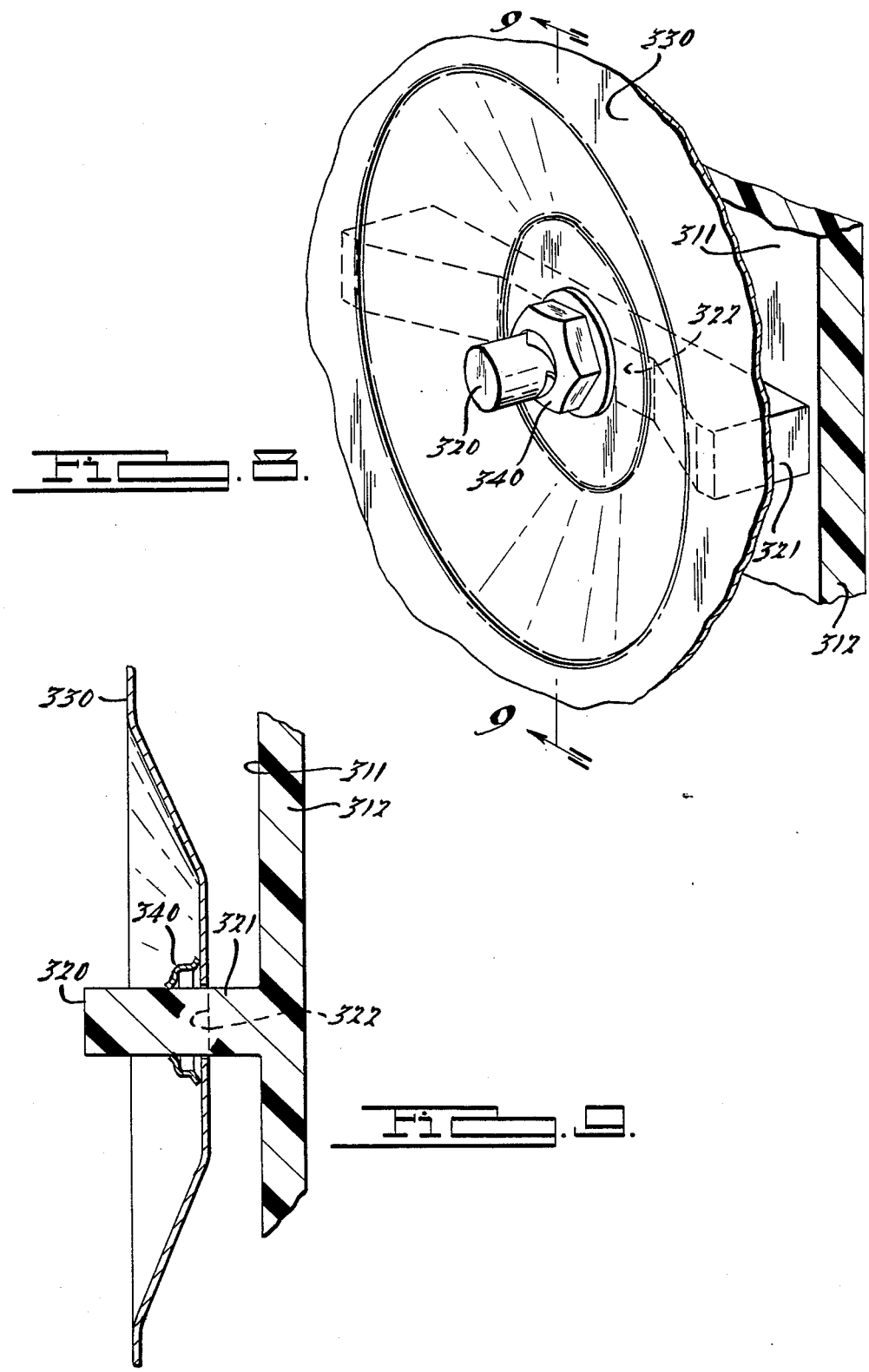

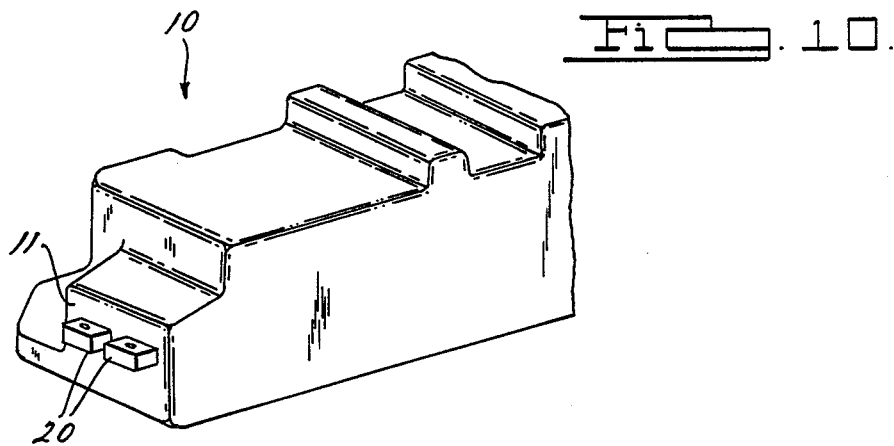

METHOD OF MAKING A HOLLOW PLASTIC ARTICLE

BACKGROUND OF THE INVENTION

1. Field of the Invention

This invention relates to manufacturing a hollow plastic product having at least one unitary, substantially solid attachment projection extending outwardly from an exterior surface. More specifically, this invention relates to a method for manufacturing a hollow plastic product using combined blow molding and squeeze molding techniques.

2. Description of the Prior Art

The manufacture of hollow plastic products using blow molding techniques is well known to those skilled in the art. Exemplary of such products are motor vehicle fuel tanks blow molded of polyethylene or other suitable homopolymer, copolymer or polymer alloy materials. It frequently is necessary or desirable to attach devices to such hollow blow molded products without disrupting the integrity or continuity of the plastic wall of the product. It is frequently desirable, for example, to attach a heat shield or other device to the exterior surface of a blow molded plastic fuel tank for a motor vehicle. Various attachment techniques are known for this purpose. Thus, for example, a suitably sized and configured plastic attachment piece can be welded to the exterior surface of the tank. The separate welding operation subsequent to the blow molding of the hollow plastic product, however, involves increased costs and complexity. The same is true of various other known methods of providing an attachment piece, such as adhesive attachment thereof to the exterior surface of the hollow plastic product. Accordingly, an improved method is needed for providing such attachment sites.

It is accordingly an object of the present invention to provide an attachment site on the exterior surface of a blow molded hollow plastic product. It is a particular object of certain preferred embodiments of the invention to provide such attachment site without the cost and complexity of a separate manufacturing operation, i.e., a manufacturing operation subsequent to the blow molding operation, for securing an attachment piece to the exterior surface of the product.

One method and apparatus for manufacturing a hollow plastic product is taught in U.S. Pat. No. 4,659,531 issued Apr. 21, 1987 to Ezaki. According to that teaching a mold half is provided having a tubular groove portion corresponding to the exterior surface of the desired hollow plastic product. The mold half also has an additional contour, specifically, a projecting groove section which extends outwardly from the tubular groove section. It is taught to supply a molten plastic parison into the tubular groove portion and separately a clump of molding material into the projecting groove section. According to Ezaki, when blow molding is carried out by introducing a pressurized gas into the parison, the aforesaid clump of molding material becomes integrated with the parison, thereby providing a hollow plastic product of unitary structure. Although Ezaki asserts that it is an advance over the previously known methods for manufacture of a hollow plastic product having a projection outwardly from the exterior surface of a main body, it nevertheless is disadvantageous in that it calls for the separate steps of providing a parison and providing a clump of molding material into the molding tool. As will be understood from the disclosure below, the present invention represents a significant advance in the art and, specifically, is an advance over the teachings of Ezaki.

SUMMARY OF THE INVENTION

According to the present invention, a blow molding process is provided for manufacturing a hollow plastic product having at least one substantially solid attachment projection unitary therewith and projecting outwardly from an exterior surface thereof. Specifically, the process of the invention comprises the steps of:

(A) forming a molten plastic parison;

(B) enclosing the molten plastic parison within a cavity formed by cooperating blow molding die parts, a void in fluid communication with such cavity and having the form of the desired attachment projection being provided at a parting line between one and another of the blow molding die parts;

(C) introducing fluid pressure into the parison, expanding it outwardly within the cavity and squeeze molding parison material into the aforesaid void in an amount sufficient to substantially fill the void; and (D) opening the molding die parts and removing the hollow plastic product, the attachment projection being a unitary feature of the plastic wall of the product.

It will be readily recognized in view of the present disclosure that the invention provides a blow molded hollow plastic product having one or more substantially solid attachment projections which are unitary with the product. The projections can extend outwardly from the exterior surface of the product in any of innumerable configurations and at any site coincident with a parting line of the blow molding die parts used to form the product. It will be within the skill of the art to so design the blow molding die parts as to position a parting line and, hence, the desired attachment projection(s) in accordance with the present invention, at location(s) suitable to the planned function of the product. Desired components then can be mounted to the product by securing the same to the attachment projection. This can be done, for example, by bolts or like fasteners through the attachment projection. Because the attachment projection(s) of the invention are substantially solid, bolt holes and the like can be formed therein to give sturdy attachment without puncturing the blow molded product, i.e., without intruding into the interior volume of the product. This is an especially significant advantage in the case of products such as fuel tanks, etc. In this regard, according to a product aspect of the invention, a motor vehicle fuel tank comprises a blow molded exterior wall having (a) at least one substantially solid attachment projection unitary with and projecting outwardly from an exterior surface of such wall, and (b) a heat shield mounted on such attachment projection in fixed spaced relation to the exterior surface of the tank wall.

Additional features and advantages of the present invention will be more apparent from the following detailed description of preferred embodiments taken in conjunction with the accompanying drawings.

BRIEF DESCRIPTION OF THE DRAWINGS

FIG. 1 is a perspective view, partially broken away and somewhat diagrammatic, showing a blow molded hollow plastic product, specifically a motor vehicle fuel tank, having an attachment projection manufactured in accordance with a preferred embodiment of the present invention.

FIG. 2 is an enlarged perspective view of section A of the blow molded hollow plastic product of FIG. 1, further showing a heat shield, partially broken away, attached by means of a clip and bolt to the attachment projection thereof.

FIG. 3 is a cross-sectional view of the blow molded hollow plastic product of FIG. 1, including the attachment projection, taken substantially along line 3—3 in FIG. 2 with the bolt shown in elevation.

FIG. 6 is an enlarged perspective view corresponding to FIG. 2, but showing another alternative embodiment of a blow molded hollow plastic product with an attachment projection manufactured according to the invention.

FIG. 7 is a section view taken along line 7—7 of FIG. 6, an attachment clip being shown partially in phantom.

FIG. 8 is an enlarged perspective view corresponding to FIG. 2, but showing another alternative embodiment of a blow molded hollow plastic product with an attachment projection manufactured according to the invention.

FIG. 9 is a section view taken along line 9—9 of FIG. 8.

FIG. 10 is a perspective view, similar to FIG. 1, showing multiple attachment projections.

DETAILED DESCRIPTION OF PREFERRED EMBODIMENTS

Figure 4:
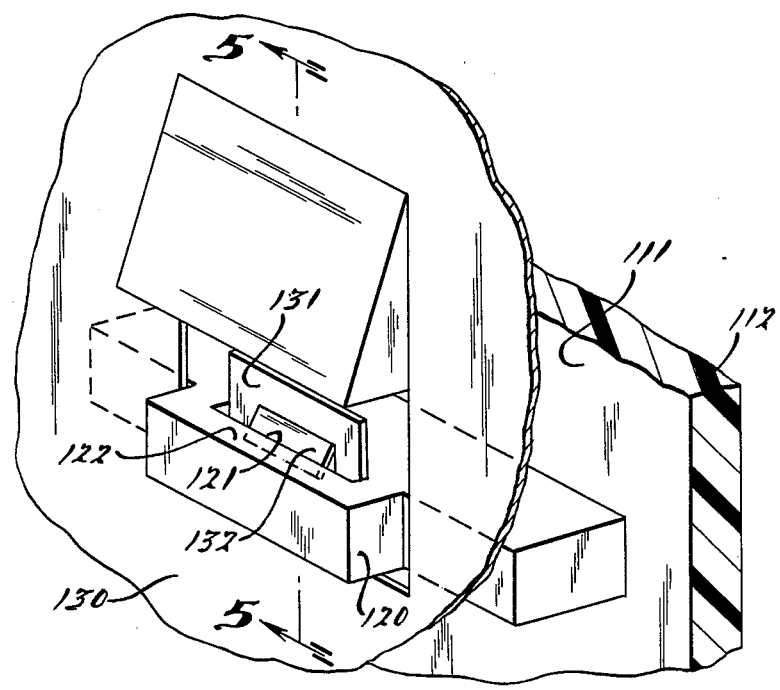
FIG. 4 is a perspective view corresponding to that of FIG. 2, but illustrating an alternative embodiment of an attachment projection on a blow molded hollow plastic product manufactured according to the invention.

Innumerable blow molded hollow plastic products suitable for a wide variety of different applications are well known to those skilled in the art. Without intending to limit the scope of the method aspect of the present invention, for purposes of exemplification and illustration the following discussion will disclose and describe a blow molded product within the scope of the product aspect of the invention, specifically, a blow molded fuel tank for a motor vehicle comprising an attachment projection securing a metal heat shield to the fuel tank. Such heat shields typically are attached in spaced relation to the main expanse of the wall of a blow molded fuel tank and may be attached to the exterior surface of the fuel tank at one or more locations. For purposes of the present disclosure a heat shield having a single attachment point will be described.

Suitable materials, particularly thermoplastic materials, for blow molding hollow plastic products are well known to those skilled in the art and many such materials are commercially available. Exemplary of such materials is polyethylene which is especially suited for motor vehicle fuel tanks, particularly when alloyed with any of various nylon or other barrier resins to reduce fuel vapor penetration. The present invention also is suitable for use in coextrusion blow molding operations to produce products wherein the walls comprise multiple distinct layers of different materials, such methods being well known to those skilled in the art.

Referring now to FIGS. 1-3, a blow molded hollow plastic fuel tank 10, suitable for use in a motor vehicle is seen to have a substantially solid attachment projection 20 unitary with and projecting outwardly from exterior surface 11 of end wall 12 of the tank. As best seen in FIG. 3, attachment projection 20 is unitary with the end wall 12 of the tank. A heat shield 30 (not shown in FIG. 1) is adapted to be secured to attachment projection 20 by means of bolt 40 and clip 50. Attachment 20 is a rectilinear, flange-like projection from wall 12 and spring clip 50 is positioned thereon in typical fashion. Bolt 40 extends through aligned holes in the heat shield 30, the top of clip 50, the attachment projection 20 and the bottom of clip 50 where it engages locking prongs 55. It will be clear to those skilled in the art that heat shield 30 can be removed from tank 10 by removal of bolt 40 for purposes of servicing the tank or motor vehicle components in its vicinity. The heat shield then can be remounted to the tank in the original fashion.

FIG. 10 illustrates a fuel tank 10 having a plurality of attachment projections 20 on the exterior surface 11.

Figure 5:
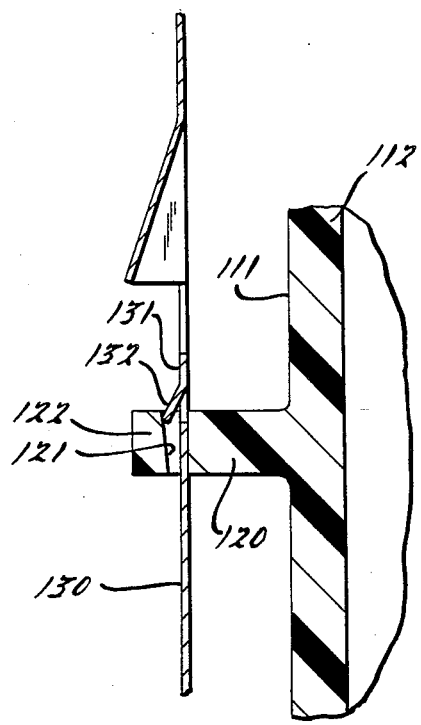
FIG. 5 is a cross-sectional view taken along line 5—5 of FIG. 4.

Referring now to FIGS. 4 and 5, substantially solid attachment projection 120 is seen to be unitary with and to project outwardly from an exterior surface 111 of a fuel tank end wall 112 and upwardly extending portion 131 of heat shield 130 is seen to extend through a tapered aperture 121 in the projection 120. Locking tab 132 of the heat shield extension 131 is seen to comprise an out-struck tab within the tapered aperture such that the heat shield 130 is removably mounted to the tank. The out-struck tab alternatively could clear the aperture to overhang end portion 122 of the projection.

Referring now to FIGS. 6 and 7, a substantially solid attachment projection 220 projecting outwardly from an exterior surface 211 of a tank end wall 212. A heat shield 230 is attached to the tank at the attachment projection 220 by means of a clip 250 having thumb-push flange 255. Clip portions 256 and 257, separated at gap 258 can be pushed onto the narrow portion 221 of the attachment projection 220. The opening 259 of clip 250 is sized to fit snugly around the small section 221 of the attachment projection 220. The clip portions 256 and 257 are resiliently bowed such that the upper and lower edges 251, 252 press the heat shield 230 against upper and lower shoulders 222, 223 of the attachment projection. The center portion of the clip presses in the opposite direction against the inside surface, i.e. shoulders 224, 225, of large end portion 226 of the attachment projection 220. The portion of the attachment projection 220 extending from the exterior surface 211 of the tank end wall 212 to the reduced size neck portion 221 is sized to provide the desired spacing of the heat shield 230 from the tank end wall 212.

Referring now to FIGS. 8 and 9, a substantially solid attachment projection 320 is seen to be unitary with and to project outwardly from an exterior surface 311 of a fuel tank end wall 312. Attachment projection 320 comprises a substantially solid, cylindrical nubbin extending outwardly from a substantially solid attachment projection base 321 which defines a somewhat concave surface 322 against which seats a correspondingly offset portion of heat shield 330. Push-on locking nut 340 is received over the cylindrical portion of attachment projection 320 to secure the heat shield 330 in fixed spaced relation to the fuel tank.

According to the method aspect of the invention, a blow molded product is made having one or more substantially solid attachment projections unitary with a wall thereof, being exemplified by but not limited to the above described attachment projections on motor vehicle fuel tanks. Such attachment projections are formed during the blow molding operation by which the product itself is manufactured. Specifically, as stated above, the attachment projection would be formed by squeeze molding at a parting line between blow mold die parts by providing a correspondingly shaped void in the surface of the mold cavity at the parting line. If desired, a vent hole or even vacuum assist can be provided at the parting line void to facilitate or assist the squeeze molding of molten parison material into the void. It will be within the skill of the art with the aid of the present disclosure to ensure sufficient excess material in the parison such that the attachment projection forming void is at least substantially filled during the blow molding/squeeze molding operation. Those skilled in the art will recognize that this is a function also of the fluid pressure injected into the interior of the parison during the blow molding/squeeze molding operation. The rate of mold closure and the sequence of molding die part closure also will be understood to be controllable factors. The selection of and control of such factors will be well within the skill of the art of blow molding hollow plastic products in view of the present disclosure.

Regarding, generally, the squeeze molding aspect of the blow molding operation according to the invention, it will be understood by those skilled in the art that parison wall thickness can be locally controlled to provide excess material at the desired location(s) of the attachment projection. Closure of the mold and injection of fluid pressure into the parison then is controlled according to generally known techniques to cause flow of parison material into the attachment projection forming void at the parting line of the blow molding die parts. Slides or other moveable die parts can be used to provide apertures, undercuts and the like in the attachment projection, such as the aperture shown in the embodiment illustrated in FIGS. 2 and 3 and that of FIGS. 4 and 5. Alternatively, such apertures and other features of the attachment projection can be provided by post blow molding manufacturing steps, e.g. drilling, milling or the like. Preferably, however, for reasons of cost and time efficiency, the attachment projection is formed in essentially its final configuration during the blow molding/squeeze molding operation of the invention, as described above.

According to preferred aspects of the invention the blow molding operation, incorporating the squeeze molding steps therein, is carried out in the following sequence. A parison is first formed according to known techniques. The blow molding die parts are partially, not completely, closed onto the parison, thereby leaving a slight gap at the parting line having the attachment projection forming void. Some blowing of the parison is then carried out causing molten parison material to enter and substantially fill the void (i.e., to substantially fill the void when the mold is fully closed). The mold is then fully closed, followed by completion of the blowing. This sequence is found to provide a less disrupted inside surface and more substantially solid attachment projection than is achieved without squeeze molding, i.e., by fully closing the mold before any blowing of the parison. This is especially important if the attachment projection is to be drilled, etc. and the inside surface of the blow molded product cannot be punctured, as for example in the case of a fuel tank or the like.

While the above provides a full and complete disclosure of the invention in terms of certain preferred embodiments, it will be apparent to those skilled in the art in view of this disclosure that various modifications, alternate constructions and embodiments may be employed without departing from the scope of the invention as defined by the appended claims.

I claim:

1. A motor vehicle fuel tank comprising a blow molded plastic exterior wall having at least one substantially solid attachment projection unitary therewith and projecting outwardly from an exterior surface of said wall, and a heat shield mounted to said attachment projection in fixed spaced relation to said exterior surface of said wall, wherein said attachment projection comprises:
   (a) a substantially rectangular projection extending substantially at right angles to said exterior surfaces of said wall, having an outwardly facing concave surface,
   (b) a substantially right-cylindrical projection normal to and extending outwardly from approximately the center of said concave surface, wherein said heat shield is mounted over said cylindrical projection and seats against at least a portion of said concave surface, and
   (c) fastening means engaging said cylindrical projection outwardly of said heat shield to secure said heat shield in fixed spaced relation to said wall.

2. The motor vehicle fuel tank of claim 1, wherein said heat shield is mounted to said fuel tank by multiple said attachment projections.

3. The motor vehicle fuel tank of claim 1, wherein said blow molded exterior wall and said attachment projection unitary therewith comprise polyethylene.

* * * * *